United States Patent
Chiu et al.

(10) Patent No.: US 9,600,370 B2
(45) Date of Patent: Mar. 21, 2017

(54) SERVER SYSTEM

(71) Applicants: INVENTEC (PUDONG) TECHNOLOGY CORPORATION, Shanghai (CN); INVENTEC CORPORATION, Taipei (TW)

(72) Inventors: Kuo-Shu Chiu, Taipei (TW); Zhong-Ying Qu, Shanghai (CN); Tianwen Zhao, Shanghai (CN); Peng Hu, Shanghai (CN); Fangjie Chu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 150 days.

(21) Appl. No.: 14/614,429

(22) Filed: Feb. 5, 2015

(65) Prior Publication Data

US 2016/0147540 A1    May 26, 2016

(30) Foreign Application Priority Data

Nov. 25, 2014  (CN) .......................... 2014 1 0691957

(51) Int. Cl.
    *G06F 11/00*    (2006.01)
    *G06F 11/14*    (2006.01)
    (Continued)

(52) U.S. Cl.
    CPC .......... *G06F 11/1417* (2013.01); *G06F 8/665* (2013.01); *G06F 9/4403* (2013.01);
    (Continued)

(58) Field of Classification Search
    CPC ............. G06F 11/1441; G06F 11/2242; G06F 11/2284; G06F 11/3024; G06F 11/3031;
    (Continued)

(56) References Cited

U.S. PATENT DOCUMENTS

2009/0193242 A1   7/2009  Huang et al.
2010/0125752 A1*  5/2010  Chen ................... G06F 11/1666
                                                                714/6.1
(Continued)

FOREIGN PATENT DOCUMENTS

TW    200928963 A    7/2009
TW    200933481 A    8/2009
TW    201207612 A    2/2012
TW    201327141 A    7/2013

*Primary Examiner* — Joseph D Manoskey
(74) *Attorney, Agent, or Firm* — Mark M. Friedman

(57) ABSTRACT

A server system is disclosed herein, which includes a first BIOS chip, a second BIOS chip, a platform controller, and a baseboard management controller. The platform controller and the baseboard management controller are electrically connected to a first multi-way selector and a second multi-way selector, respectively. The first multi-way selector and the second multi-way selector are individually electrically connected to both the first BIOS chip and the second BIOS chip. The disclosure can accomplish an aspect that when either of the first BIOS chip and the second BIOS chip fails in activating the server system, the server system can be automatically activated by the other BIOS chip. Further, by the baseboard management controller, a firmware of the fail-to-activate BIOS chip can be simultaneously updated, thereby improving security and reliability of the server system.

13 Claims, 2 Drawing Sheets

(51) Int. Cl.
*G06F 11/22* (2006.01)
*G06F 11/30* (2006.01)
*G06F 13/42* (2006.01)
*G06F 13/40* (2006.01)
*G06F 9/445* (2006.01)
*G06F 9/44* (2006.01)

(52) U.S. Cl.
CPC ...... *G06F 11/1441* (2013.01); *G06F 11/2242* (2013.01); *G06F 11/2284* (2013.01); *G06F 11/3024* (2013.01); *G06F 11/3031* (2013.01); *G06F 13/4022* (2013.01); *G06F 13/4282* (2013.01)

(58) Field of Classification Search
CPC ............. G06F 11/1417; G06F 11/1438; G06F 13/4022; G06F 13/4282; G06F 8/668; G06F 9/4403
USPC .......................................... 714/36, 10, 23, 42
See application file for complete search history.

(56) References Cited

U.S. PATENT DOCUMENTS

| | | | |
|---|---|---|---|
| 2012/0011355 A1* | 1/2012 | Tang | G06F 11/1433 713/100 |
| 2012/0023320 A1* | 1/2012 | Chen | G06F 11/0793 713/2 |
| 2012/0079260 A1* | 3/2012 | Yin | G06F 11/1417 713/2 |
| 2012/0110379 A1* | 5/2012 | Shao | G06F 11/1417 714/15 |
| 2013/0166896 A1* | 6/2013 | Peng | G06F 13/102 713/2 |
| 2013/0173833 A1 | 7/2013 | Zou et al. | |
| 2013/0326278 A1* | 12/2013 | Yin | G06F 11/362 714/38.1 |
| 2014/0137095 A1 | 5/2014 | Chiu et al. | |
| 2015/0074385 A1* | 3/2015 | Zheng | G06F 8/665 713/2 |

\* cited by examiner

SERVER SYSTEM

TECHNICAL FIELD

The disclosure relates to server technology, and more particularly, to a server system.

BACKGROUND

Server is a significant infrastructure for network architecture. In the server, a basis input/output system (BIOS) is an extremely important module, commonly. In booting, it requires to initialize various hardware devices according to a BIOS setting, whereby an operation system can operate the respective hardware devices after starting running.

Currently, a server system has mostly one BIOS chip disposed therein. If a power on self-test (POST) fails, it requires to repair or offline-update a firmware of the BIOS chip. This is inconvenient for users. If the server system has an extra BIOS chip additionally disposed therein, the server system can automatically switch to the other BIOS chip to normally activate the server system as long as either one of the BIOS chips fails to perform the POST or its firmware has a defect in itself. This provides a great convenience for a data center or an architecture employing a great amount of servers. In conventional skills, a desktop computer can also adopt the afore-described BIOS chip backup design but it requires manual intervention to achieve the BIOS chip switching effect.

In conventional designs, a baseboard management controller (BMC) disposed in the server system is applied to electrically connect a to-be-monitored BIOS chip with a serial peripheral interface (SPI) of the baseboard management controller, thereby carrying out monitoring and determining, by the baseboard management controller, whether or not the BIOS chip perform the POST, normally. However, there have following problems if two BIOS chips are electrically connected to the baseboard management controller at the same time. That is, how to identify the two BIOS chips for determining which one of the BIOS chips can be used to active the server system normally.

Therefore, there is a need to provide a novel server system for solving above problems.

SUMMARY

To solve the above technical problems existed in the conventional skills, the objective of the disclosure is to provide a server system for accomplishing an aspect that when either of the first BIOS chip and the second BIOS chip fails in activating the server system, the server system can be automatically activated by the other BIOS chip, and further having a capability of simultaneously updating a firmware of the fail-to-activate BIOS chip, by using a baseboard management controller, thereby assuring the security and reliability of the server system.

To achieve the above objective, the disclosure provides a server system, comprising a first BIOS chip; a second BIOS chip; a platform controller electrically connected to a first multi-way selector, the first multi-way selector being electrically connected to the first BIOS chip and the second BIOS chip; and a baseboard management controller electrically connected to a second multi-way selector, the second multi-way selector being electrically connected to the first BIOS chip and the second BIOS chip.

BRIEF DESCRIPTION OF THE DRAWINGS

To make the aforesaid objectives, other objectives, features, and advantages of the disclosure more easily understood, it will be described in details in conjunction with the appending drawings.

DETAILED DESCRIPTION

Figure 1:
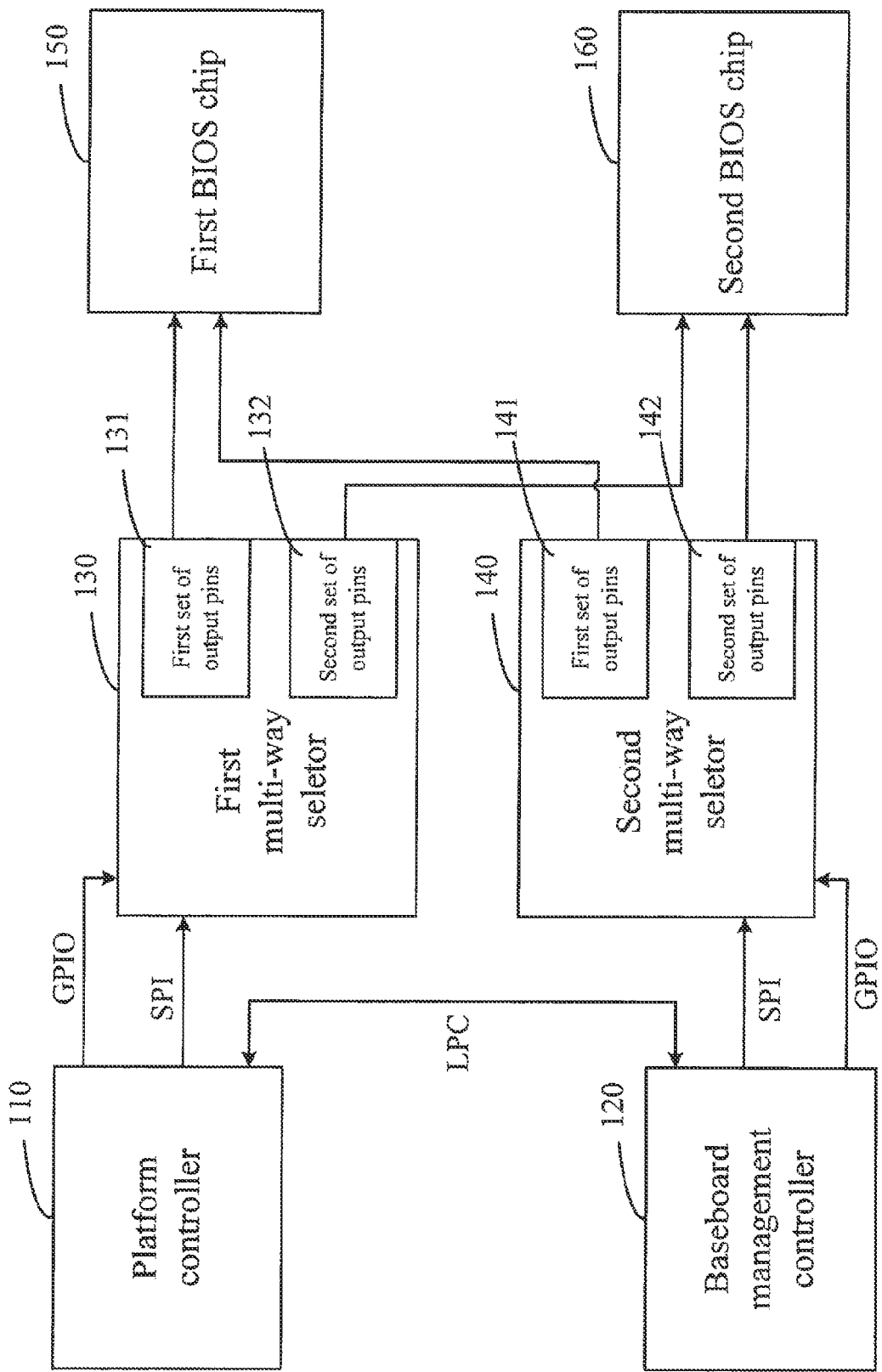
FIG. 1 is an illustration of a server system block diagram in accordance with an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which illustrates an embodiment of a server system block diagram in the disclosure. The server system comprises a first BIOS chip 150, a second BIOS chip 160, a platform controller 110, and a baseboard management controller 120. The platform controller 110 is electrically connected to a first multi-way selector 130. The first multi-way selector 130 is electrically connected to the first BIOS chip 150 and the second BIOS chip 160. The baseboard management controller 120 is electrically connected to a second multi-way selector 140. The second multi-way selector 140 is electrically connected to the first BIOS chip 150 and the second BIOS chip 160. When either of the first BIOS chip 150 and the second BIOS chip 160 fails to activate the server system, the server system can be activated automatically by the other BIOS chip. Specifically, when the first BIOS chip 150 fails to activate the server system, the server system can be activated automatically by the second BIOS chip 160; and when the second BIOS chip 160 fails to activate the server system, the server system can be activated automatically by the first BIOS chip 150. Compared to manual switch in the conventional skills, the disclosure can provide a function of automatic switch between the two BIOS chips 150, 160. Moreover, when either of the first BIOS chip 150 and the second BIOS chip 160 fails to active the server system, the server system can be activated automatically by the other BIOS chip, and the baseboard management controller 120 can simultaneously update a firmware (version) of the fail-to-active BIOS chip. Such a function was never carried out in the conventional skills. A process of updating the firmware (version) of the fail-to-active BIOS chip by the baseboard management controller 120 will be further detailed below.

In addition, by using a BIOS chip firmware contained in the baseboard management controller 120, the server system updates the firmware of the fail-to-activate BIOS chip. In the present embodiment, a firmware of the first BIOS chip 150 and a firmware of the second BIOS chip 160 are included in the baseboard management controller 120 and are a same firmware, thereby assuring that when either of the BIOS chips fails to active the server system, the server system can be activated automatically by the other BIOS chip without affecting original operation of the server system. This assures the reliability of the server system. Before the baseboard management controller 120 can simultaneously update the firmware of the fail-to active BIOS chip, the server system receives an update command transmitted from outside for updating the firmware of either the first BIOS chip 150 or the second BIOS chip 160 which fails to activate the server system. In the present embodiment, a GPIO (General-purpose input/output) pin of the baseboard management controller 120 is electrically connected to the second multi-way selector 140. In such a configuration, the update command may be transmitted by the baseboard management controller 120 remotely or locally executing a specific command (e.g., IPMI command) of the baseboard management controller 120 for updating the firmware of the first BIOS chip 150 or the second BIOS chip 160 which fails to activate the server system. In some other embodiments, a GPIO pin of the platform controller 110 is electrically connected to the first multi-way selector 130. In such a configuration, the update command may also be used to update the first BIOS chip 150 or the second BIOS chip 160 by the platform controller 110. It is noted that in the present embodiment, the update command is used to update the firmware of either the first BIOS chip 150 or the second BIOS chip 160 which fails to activate the server system. Similarly, in some other embodiments, such an update command is also applicable to updating the firmware of either the first BIOS chip 150 or the second BIOS chip 160 which operates normally. In addition, the processes of updating the firmware of either the first BIOS chip 150 or the second BIOS chip 160, respectively by the baseboard management controller 120 and the platform controller 110 under the afore-mentioned two different configurations will be further detailed below.

Please continue with reference to FIG. 1. In the present embodiment, the platform controller 110 is electrically connected to the baseboard management controller 120 for communication of control messages. Specifically, the platform controller 110 is electrically connected to the baseboard management controller 120 via a LPC (Low Pin Count) communication link for transmission of the control messages.

The platform controller 110 comprises at least one first GPIO pin electrically connected to a selection pin of the first multi-way selector 130, and the baseboard management controller 120 comprises at least one second GPIO pin electrically connected to a selection pin of the second multi-way selector 140. Specifically, each of the first multi-way selector 130 and the second multi-way selector 140 comprises a plurality sets of output pins (e.g., two sets of output pins), and gating signals of the first multi-way selector 130 and the second multi-way selector 140 are reverse signals with regard to each other in a default setting. That is, the grating signal of the second multi-way selector 140 is an ineffective signal if the grating signal of the first multi-way selector 130 is an effective signal. A first set of the output pins 131 is selected from the plural sets of output pins of the first multi-way selector 130 while a second set of the output pins 142 is selected from the plural sets of output pins of the second multi-way selector 140. The present embodiment has such a default setting. Of course, an opposite setting may also be adopted. That is, the grating signal of the second multi-way selector 140 is an effective signal if the grating signal of the first multi-way selector 130 is an ineffective signal. A second set of the output pins 132 is selected from the plural sets of output pins of the first multi-way selector 130 while a first set of the output pins 141 is selected from the plural sets of output pins of the second multi-way selector 140. By following the manner, the other logics also need to be varied.

In the present embodiment, the platform controller 110 communicates with the first multi-way selector 130 by employing a first SPI signal and at least one first GPIO signal and the baseboard management controller 120 communicates with the second multi-way selector 140 by employing a second SPI signal and at least one second GPIO signal. It is noted that in such a configuration, the platform controller 110 and the baseboard management controller 120 are electrically connected via a LPC communication link for transmission of control messages.

Further, the platform controller 110 selectively turns on the gating signal of the first multi-way selector 130 through the first GPIO signal so as to transmit the first SPI signal to either the first BIOS chip 150 or the second BIOS chip 160, and the baseboard management controller 120 selectively turns on the gating signal of the second multi-way selector 140 through the second GPIO signal so as to transmit the second SPI signal to either the first BIOS chip 150 or the second BIOS chip 160. When the platform controller 110 selectively turns on the gating signal of the first multi-way selector 130 through the first GPIO signal, the baseboard management controller 120 prohibits the grating signal of the second multi-way selector 140 from being selectively turned on, by way of the second GPIO signal. In this embodiment, the at least one first GPIO pin of the platform controller 110 communicates with the at least one second GPIO pin of the baseboard management controller 120 via LPC such that an either-or selection is made between the first multi-way selector 130 and the second multi-way selector 140, thereby carrying out a selection of either the first BIOS chip 150 or the second BIOS chip 160. Specifically speaking, the baseboard management controller 120 establishes a connection to the second BIOS chip 160 through the second multi-way selector 140 according to the either-or selection rule when the platform controller 110 selectively turns on the gating signal of the first multi-way selector 130 by way of the first GPIO signal and establishes a connection to the first BIOS chip 150; the baseboard management controller 120 establishes a connection to the first BIOS chip 150 through the second multi-way selector 140 according to the either-or selection rule when the platform controller 110 selectively turns on the gating signal of the first multi-way selector 130 by way of the first GPIO signal and establishes a connection to the second BIOS chip 160.

In a default setting as illustrated with one embodiment, the platform controller 110 communicates with the first multi-way selector 130 by employing the first SPI signal and the at least one first GPIO signal and the baseboard management controller 120 communicates with the second multi-way selector 140 by employing the second SPI signal and the at least one second GPIO signal. When the first BIOS chip 150 fails in POST (power on self-test) and the platform controller 110 detects that the first BIOS chip 150 fails to activate the server system, the platform controller 110 transmits a control message to the baseboard management controller 120 via the LPC communication link. Simultaneously, the platform controller 110 transmits the first GPIO signal to the first multi-way selector 130 according to a preset (software) setting. After the selection pin of the first multi-way selector 130 receives the first GPIO signal, the first GPIO signal serves as the grating signal and whether or not the grating signal is an effective signal is determined. If the grating signal is determined as an effective signal, the first set of the output pins 131 of the first multi-way selector 130 is selected. If the grating signal is determined as an ineffective signal, the second set of the output pins 132 of the first multi-way selector 130 is selected. When the grating signal is determined to be the ineffective signal, the second set of the output pins 132 of the first multi-way selector 130 is selected and the platform controller 110 transmits, via the second set of the output pins 132 of the first multi-way selector 130, the first SPI signal to the second BIOS chip 160 electrically connected with the second set of the output pins 132 (when the first BIOS chip 150 succeeds in activating the server system, the grating signal of the first multi-way selector 130 selectively turned on by the platform controller 110 by way of the first GPIO signal is an effective signal, the first set of the output pins 131 of the first multi-way selector 130 is selected, and the platform controller 110 transmits, via the first set of the output pins 131 of the first multi-way selector 130, the first SPI signal to the first BIOS chip 150 electrically connected with the first set of the output pins 131). Since the baseboard management controller 120 receives the control message transmitted from the platform controller 110, the baseboard management controller 120 will transmit a reset command whereby the second BIOS chip 160 performs the POST to active the server system. Simultaneously, the baseboard management controller 120 transmits the second GPIO signal to the second multi-way selector 140. After the selection pin of the second multi-way selector 140 receives the second GPIO signal, the second GPIO signal is served as the grating signal and whether or not the grating signal is an effective signal is determined. If the grating signal is determined as an effective signal, the first set of the output pins 141 of the second multi-way selector 140 is selected. If the grating signal is determined as an ineffective signal, the second set of the output pins 142 of the second multi-way selector 140 is selected. When the grating signal is determined to be the effective signal, the first set of the output pins 141 of the second multi-way selector 140 is selected, the baseboard management controller 120 transmits, via the first set of the output pins 141 of the second multi-way selector 140, the second SPI signal to the first BIOS chip 150 electrically connected with the first set of the output pins 141, and baseboard management controller 120 updates the firmware of the first BIOS chip 150 (when the first BIOS chip 150 succeeds in activating the server system, the baseboard management controller 120 transmits the second GPIO signal to the second multi-way selector 140, the grating signal of the second multi-way selector 140 selectively turned on by way of the second GPIO signal is determined to be an effective signal, the second set of the output pins 142 of the second multi-way selector 140 is selected, and the baseboard management controller 120 transmits, via the second set of the output pins 142 of the second multi-way selector 140, the second SPI signal to the second BIOS chip 160 electrically connected with the second set of the output pins 142). In addition, it is noted that when the platform controller 110 selectively turns on the gating signal of the first multi-way selector 130 by way of the first GPIO signal, the baseboard management controller 120 prohibits the grating signal of the second multi-way selector 140 from being selectively turned on, by way of the second GPIO signal, thereby carrying out logical selecting either the first BIOS chip 150 or the second BIOS chip 160 by the platform controller 110 and the baseboard management controller 120 in the preset software setting. Such a selection has an either-or effect.

Figure 2:
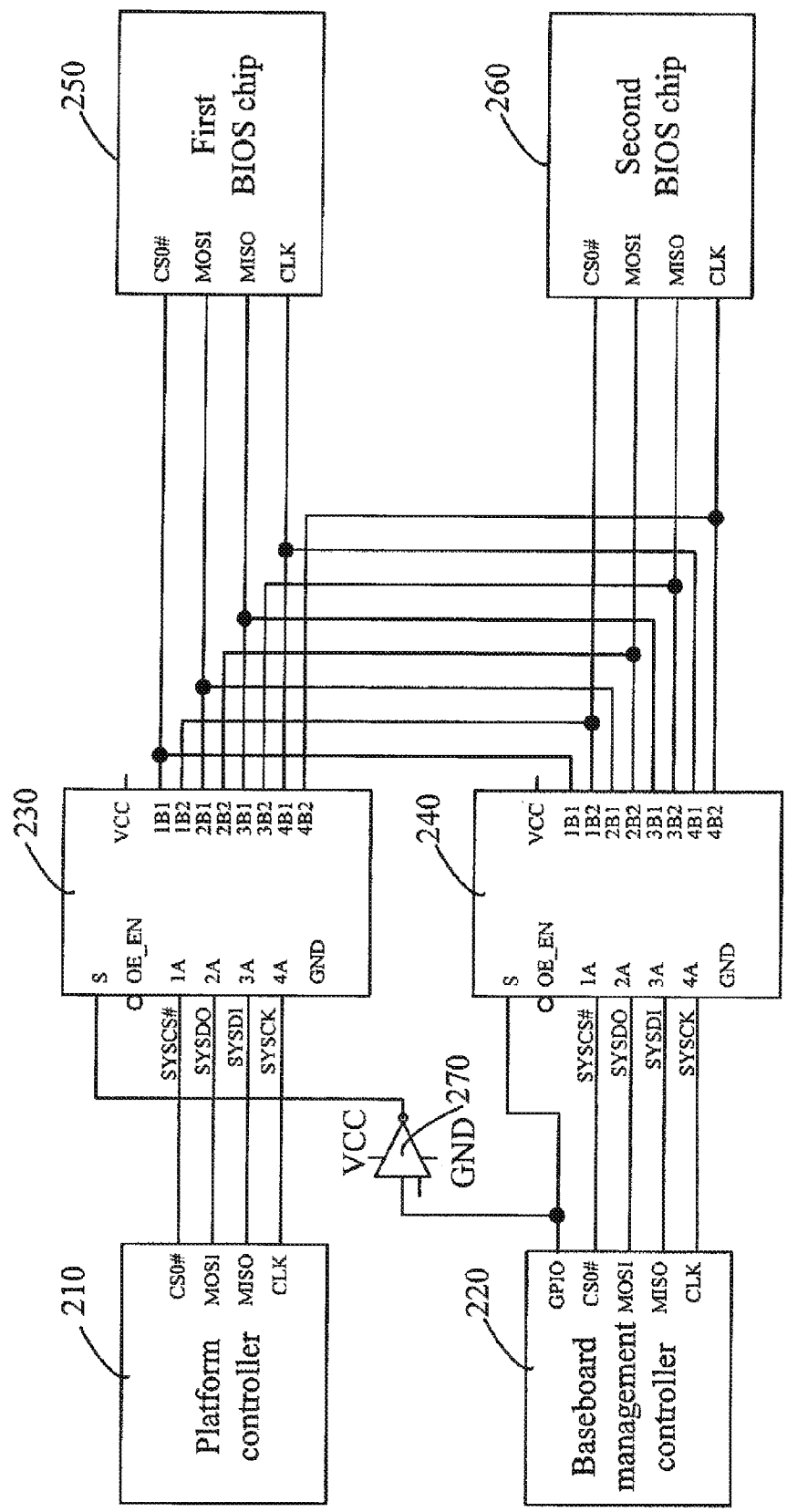
FIG. 2 is an illustration of a server system block diagram in accordance with another embodiment.

Please refer to FIG. 2. In another embodiment, the baseboard management controller 220 comprises at least one third GPIO pin which is electrically connected to the selection pin of the first multi-way selector 230 and the selection pin of the second multi-way selector 240. Each of the first multi-way selector 230 and the second multi-way selector 240 comprises a plurality sets of output pins, for example, two sets of output pins, that is, a first set of the output pins of the first multi-way selector 230 (pin 1B1, pin 2B1, pin 3B1, pin 4B1, and so on as shown in the component 230 in FIG. 2), a second set of the output pins of the first multi-way selector 230 (pin 1B2, pin 2B2, pin 3B2, pin 4B2, and so on as shown in the component 230 in FIG. 2), a first set of the output pins of the second multi-way selector 240 (pin 1B1, pin 2B1, pin 3B1, pin 4B1, and so on as shown in the component 240 in FIG. 2), and a second set of the output pins of the second multi-way selector 240 (pin 1B2, pin 2B2, pin 3B2, pin 4B2, and so on as shown in the component 240 in FIG. 2). Both of the first multi-way selector 230 and the second multi-way selector 240 may adopt a selector with a model No. 74CBT3257. The disclosure is not limited to the model of multi-way selector.

In the embodiment, the at least one third GPIO pin comprises a fourth GPIO pin which is electrically connected to the selection pin of the first multi-way selector 230 via an inverter 270 and is electrically connected to the selection pin of the second multi-way selector 240. Of course, in other embodiments, the at least one third GPIO pin may comprise a fifth GPIO pin and a sixth GPIO pin. The fifth GPIO pin is electrically connected to the selection pin of the first multi-way selector 230 and the sixth GPIO pin is electrically connected to the selection pin of the second multi-way selector 240. If the arrangement of the GPIO pin and the inverter 270 in the embodiment is adopted, only one GPIO pin is needed, thereby saving amount of the GPIO pins in use. The inverter 270 is a common inverter and its structure and function are not detailed herein. In a default setting, the platform controller 210 establishes a connection to the first BIOS chip 250 via the first set of the output pins (pin 1B1, pin 2B1, pin 3B1, and pin 4B1 as shown in FIG. 2) of the first multi-way selector 230 so as to activate the server system by the first BIOS chip 250.

When the baseboard management controller 220 detects that the first BIOS chip 250 fails to activate the server system, the baseboard management controller 220 automatically transmits a control command to the first multi-way selector 230, the platform controller 210 establishes a connection to the second BIOS chip 260 via the second set of the output pins (pin 1B2, pin 2B2, pin 3B2, and pin 4B2 as shown in FIG. 2) of the first multi-way selector 230, and the baseboard management controller 220 transmits a reset command whereby the second BIOS chip 260 performs the POST to active the server system. In such a manner, either of the first BIOS chip 250 and the second BIOS chip 260 fails to activate the server system, it can be activated automatically by the other BIOS chip. Further, the first multi-way selector 230 and the second multi-way selector 240 are independent to each other. Therefore, by the baseboard management controller 220, the firmware of the fail-to-activate BIOS chip can be simultaneously updated without affecting the normal operations of the server system, thereby improving security and reliability of the server system.

Specifically, the platform controller 210 communicates with the baseboard management controller 220 via the LPC communication link for acquiring the control message. Accordingly, when the first BIOS chip 250 succeeds in activating the server system, the platform controller 210 will transmit a control message to the baseboard management controller 220. When the first BIOS chip 250 fails in the POST, the platform controller 210 primarily connected with the first BIOS chip 250 detects that the first BIOS chip 250 fails in activation, and then the platform controller 210 transmits the control message to the baseboard management controller 220. In such a manner, the baseboard management controller 220 detects that the first BIOS chip 250 fails in activation, and then the baseboard management controller 220 automatically transmits a control command to the first multi-way selector 230. When the baseboard management controller 220 transmits the control command to the first multi-way selector 230, the control command is a signal operative to change from a high voltage level to a low voltage level (i.e., the signal received by the selection pin of the first multi-way selector 230 is operative to change from the high voltage level to the low voltage level and the signal received by the selection pin of the second multi-way selector 240 is operative to change from the low voltage level to the high voltage level). It is noted that in the present embodiment, the selection pin of the first multi-way selector 230 and the selection pin of the second multi-way selector 240 are predetermined to be effective when they have the high voltage level, and the first set of the output pins (pin 1B1, pin 281, pin 3B1, and pin 4B1 as shown in FIG. 2) is selected in the effective high voltage level condition and the second set of the output pins (pin 1B2, pin 2B2, pin 3B2, and pin 4B2 as shown in FIG. 2) is selected in the low voltage level condition. Therefore, after the control command is transmitted to the first multi-way selector 230 by the baseboard management controller 220, the platform controller 210 establishes a connection to the second BIOS chip 260 via the second set of the output pins (pin 1B2, pin 2B2, pin 3B2, and pin 4B2 as shown in FIG. 2) of the first multi-way selector 230, and the baseboard management controller 220 transmits the rest command whereby the second BIOS chip 260 performs the POST to activate the server system. Simultaneously, the baseboard management controller 220 establishes a connection to the first BIOS chip 250 via the first set of the output pins (pin 1B1, pin 2B1, pin 3B1, and pin 4B1 as shown in FIG. 2) of the second multi-way selector 240 and then updates the firmware (version) of the first BIOS chip 250. The firmware of the first BIOS chip 250 may be updated by the baseboard management controller 220 remotely or locally executing a specific command (e.g., IPMI command) of the baseboard management controller 220.

In addition, the baseboard management controller 220 comprises a register unit (not shown). The register unit is used to store recording messages of POST failures of the first BIOS chip 250 or the second BIOS chip 260, whereby which one of the first BIOS chip 250 and the second BIOS chip 260 fails in the POST or has a defect in itself can be determined. In such a manner, the firmware of the fail-to-activate BIOS chip can be updated by using a BIOS chip firmware contained in the baseboard management controller 220, thereby improving maintenance efficiency.

The afore-described embodiment is illustrated merely with the first BIOS chip 250 which fails in the POST, for explaining that the server system will automatically switch from the first BIOS chip 250 to the second BIOS chip 260 and will be activated by the second BIOS chip 260, and simultaneously the firmware of the first BIOS chip 250 is updated when the first BIOS chip 250 fails in the POST and cannot activate the server system.

In another embodiment of the disclosure with reference to FIG. 2, the structure of this embodiment is the same as that of the embodiment shown in FIG. 2 but the preset effective settings for the selection pins of the multi-way selectors (the first multi-way selector 230 and the second multi-way selector 240) of them are different from each other as well as their output pins selected in the effective condition are different. In this embodiment, the preset setting is that the platform controller 210 establishes a connection to the second BIOS chip 260 via the second set of the output pins (pin 1B2, pin 2B2, pin 3B2, and pin 4B2 as shown in FIG. 2) of the first multi-way selector 230. If the second BIOS chip 260 fails in the POST, the platform controller 210 transmits a control message to the baseboard management controller 220 when the platform controller 210 primarily connected with the second BIOS chip 260 detects that the second BIOS chip 260 fails in activation. In such a manner, the baseboard management controller 220 detects that the second BIOS chip 260 fails in activation, and then the baseboard management controller 220 automatically transmits a control command to the first multi-way selector 230. When the baseboard management controller 220 transmits the control command to the first multi-way selector 230, the control command is a signal operative to change from a low voltage level to a high voltage level (i.e., the signal received by the selection pin of the first multi-way selector 230 is operative to change from the low voltage level to the high voltage level and the signal received by the selection pin of the second multi-way selector 240 is operative to change from the high voltage level to the low voltage level). It is noted that in this embodiment, the selection pin of the first multi-way selector 230 and the selection pin of the second multi-way selector 240 are predetermined to be effective when they have the low voltage level, and the second set of the output pins (pin 1B2, pin 2B2, pin 3B2, and pin 4B2 as shown in FIG. 2) is selected in the effective low voltage level condition and the first set of the output pins (pin 1B1, pin 2B1, pin 3B1, and pin 4B1 as shown in FIG. 2) is selected in the high voltage level condition. Therefore, after the control command is transmitted to the first multi-way selector 230 by the baseboard management controller 220, the platform controller 210 establishes a connection to the first BIOS chip 250 via the first set of the output pins (pin 1B1, pin 2B1, pin 3B1, and pin 4B1 as shown in FIG. 2) of the first multi-way selector 230, and the baseboard management controller 220 transmits a rest command whereby the first BIOS chip 250 performs the POST to activate the server system. After the control command is transmitted to the first multi-way selector 230 by the baseboard management controller 220, the baseboard management controller 220 establishes a connection to the second BIOS chip 260 via the second set of the output pins (pin 1B2, pin 2B2, pin 3B2, and pin 4B2 as shown in FIG. 2) of the second multi-way selector 240 and updates the firmware (version) of the second BIOS chip 260.

In the above context, the preset effective setting for the selection pins of the multi-way selectors and the output pins selected in the effective condition can be set according to practical situations, and the disclosure is not limited thereto. As long as with cooperation between the GPIO pins and the selection pins of the multi-way selectors, it can be carried out establishing a connection between the platform controller 210 and the first BIOS chip 250 or between the platform controller 210 and the second BIOS chip 260, and simultaneously correspondingly establishing a connection between the baseboard management controller 220 and the second BIOS chip 260 or between the baseboard management controller 220 and the first BIOS chip 250, which is regarded as an either-or effect.

It is noted that as compared with the afore-described embodiment and the former one embodiment, the present embodiment achieves the either-or effect on the multi-way selectors by way of a single GPIO pin (cooperating with an inverter 270) of the baseboard management controller 220 but the former one embodiment uses the respective GPIO pins of the platform controller 210 and the baseboard management controller 220 to achieve the either-or effect by way of the LPC communication link.

In addition, it is noted that in FIG. 2, CS0# indicates a chip selection signal, MOSI indicates a serial data input, MOST indicates a serial data output, CLK indicates a clock signal, VCC indicates an input voltage, GND indicates a ground voltage, S indicates the selection pins, and OE_N indicates an enable pin.

While the embodiments of the disclosure have been illustrated and described in detail, various modifications and alterations can be made by persons skilled in this art. The embodiment of the disclosure is therefore described in an illustrative but not restrictive sense. It is intended that the disclosure should not be limited to the particular forms as illustrated, and that all modifications and alterations which maintain the spirit and realm of the disclosure are within the scope as defined in the appended claims.

What is claimed is:

1. A server system, comprising:
   a first BIOS chip;
   a second BIOS chip;
   a platform controller electrically connected to a first multi-way selector, the first multi-way selector being electrically connected to the first BIOS chip and the second BIOS chip; and
   a baseboard management controller electrically connected to a second multi-way selector, the second multi-way selector being electrically connected to the first BIOS chip and the second BIOS chip;
   wherein the platform controller is electrically connected to the baseboard management controller, for communication of control messages;
   wherein the platform controller comprises at least one first GPIO pin electrically connected to a selection pin of the first multi-way selector, and the baseboard management controller comprises at least one second GPIO pin electrically connected to a selection pin of the second multi-way selector;
   wherein each of the first multi-way selector and the second multi-way selector comprises a plurality sets of output pins, and a gating signal of either of the first multi-way selector and the second multi-way selector is preset as an effective signal for selecting a first set of the output pins among the plural sets;
   wherein the platform controller communicates with the first multi-way selector through a first SPI signal and at least one first GPIO signal, and the baseboard management controller communicates with the second multi-way selector through a second SPI signal and at least one second GPIO signal;
   wherein the platform controller selectively turns on the gating, signal of the first multi-way selector through the first GPIO signal so as to transmit the first SPI signal to either the first BIOS chip or the second BIOS chip, the baseboard management controller selectively turns on the gating signal of the second multi-way selector through the second GPIO signal so as to transmit the second SPI signal to either the first BIOS chip or the second BIOS chip, and when the platform controller selectively turns on the gating signal of the first multi-way selector through the first GPIO signal, the baseboard management controller prohibits the grating signal of the second multi-way selector from being selectively turned on, by way of the second GPIO signal.

2. The server system according to claim 1, wherein when either of the first BIOS chip and the second BIOS chip fails to activate the server system, the server system will be activated automatically by the other BIOS chip.

3. The server system according to claim 2, wherein when either of the first BIOS chip and the second BIOS chip fails to activate the server system, the server system will be activated automatically by the other BIOS chip and the baseboard management controller will simultaneously update a firmware of the fail-to-activate BIOS chip.

4. The server system according to claim 3, wherein by using a BIOS chip firmware contained in the baseboard management controller, the server system updates the firmware of the fail-to-activate BIOS chip.

5. The server system according to claim 1, wherein the server system receives an external update command for updating the firmware of either the first BIOS chip or the second BIOS chip.

6. The server system according to claim 1, wherein the baseboard management controller comprises at least one third GPIO pin which is electrically connected to the selection pin of the first multi-way selector and the selection pin of the second multi-way selector.

7. The server system according to claim 6, wherein the at least one third GPIO pin comprises a fourth GPIO pin which is electrically connected to the selection pin of the first multi-way selector via an inverter and is electrically connected to the selection pin of the second multi-way selector.

8. The server system according to claim 6, wherein the at least one third GPIO pin comprises a fifth GPIO pin and a sixth GPIO pin, the fifth GPIO pin is electrically connected to the selection pin of the first multi-way selector, and the sixth GPIO pin is electrically connected to the selection pin of the second multi-way selector.

9. The server system according to claim 1, wherein in a default setting, the platform controller establishes a connection to the first BIOS chip via the first set of the output pins of the first multi-way selector so as to activate the server system by the first BIOS chip.

10. The server system according to claim 9, wherein when the baseboard management controller detects that the first BIOS chip fails in POST (power on self-test), the baseboard management controller automatically transmits a control command to the first multi-way selector, the platform controller establishes a connection to the second BIOS chip via a second set of the output pins of the first multi-way selector, and the baseboard management controller transmits a reset command such that the second BIOS chip performs the POST to active the server system.

11. The server system according to claim 10, wherein after the control command is transmitted to the first multi-way selector by the baseboard management controller, the baseboard management controller establishes a connection to the first BIOS chip via the first set of the output pins of the second multi-way selector and then updates a firmware of the first BIOS chip.

12. The server system according to claim 11, wherein when the baseboard management controller transmits the control command to the first multi-way selector, the control command is a signal operative to change from a high voltage level to a low voltage level.

13. The server system according to claim 11 wherein the firmware of the first BIOS chip is updated by the baseboard management controller remotely or locally executing a specific command of the baseboard management controller.

* * * * *